(12) United States Patent
Lee et al.

(10) Patent No.: US 8,349,053 B2
(45) Date of Patent: Jan. 8, 2013

(54) HIGH EFFICIENCY GAS CONCENTRATING APPARATUS AND METHOD OF CONTROLLING HIGH EFFICIENCY GAS CONCENTRATING APPARATUS

(75) Inventors: Tae Soo Lee, Gyeonggi-do (KR); Yoon Sun Choi, Seoul (KR); Seung Kwon Oh, Gyeonggi-do (KR); Shin Kyu Han, Seoul (KR)

(73) Assignees: Oxus Co., Ltd., Gyeonggi-do (KR); Sogang University Industry-University Cooperation Foundation, Seoul (KR)

( * ) Notice: Subject to any disclaimer, the term of this patent is extended or adjusted under 35 U.S.C. 154(b) by 465 days.

(21) Appl. No.: 12/701,916

(22) Filed: Feb. 8, 2010

(65) Prior Publication Data
US 2011/0154986 A1 Jun. 30, 2011

(30) Foreign Application Priority Data
Dec. 29, 2009 (KR) ........................ 10-2009-0133285

(51) Int. Cl.
*B01D 53/02* (2006.01)
(52) U.S. Cl. .................. 95/96; 95/105; 95/128; 95/148; 96/130; 96/143; 128/205.12; 128/205.27
(58) Field of Classification Search ............. 95/96, 105, 95/128, 148; 96/130, 143; 128/205.12, 205.27
See application file for complete search history.

(56) References Cited

U.S. PATENT DOCUMENTS

| | | | |
|---|---|---|---|
| 4,681,099 A * | 7/1987 | Sato et al. ................ | 128/204.23 |
| 4,917,710 A | 4/1990 | Haruna et al. | |
| 5,505,765 A | 4/1996 | Kaji et al. | |
| 6,314,957 B1 * | 11/2001 | Boissin et al. ........... | 128/204.17 |

FOREIGN PATENT DOCUMENTS

| | | |
|---|---|---|
| KR | 1991-0009568 | 11/1991 |
| KR | 2003-0021116 | 3/2003 |
| KR | 10-0858195 | 9/2008 |

* cited by examiner

Primary Examiner — Robert A Hopkins

(57) ABSTRACT

A high efficiency gas concentrating apparatus includes an air compressor for supplying high pressure air, first and second adsorption towers that are disposed above the air compressor and communicating with the air compressor to adsorb nitrogen and concentrate oxygen as the high pressure air is alternately supplied thereto, first and second concentrating passages that are disposed above the respective first and second adsorption towers to discharge the concentrated oxygen, and a cleaning tank that is disposed between the first and second concentrating passages to receive a portion of the concentrated oxygen from one of the first and second adsorption towers, temporarily store the received concentrated oxygen therein, and alternately remove adsorbed nitrogen by supplying the temporarily concentrated oxygen to the other of the first and second adsorption towers.

21 Claims, 14 Drawing Sheets

|  | S1 | S2 | S3 | S4 | S5 | S6 | S7 | S8 | S9 | S10 |
|---|---|---|---|---|---|---|---|---|---|---|
| FIRST PRESSURIZING VALVE | ON | | ON | ON | ON | | | | | ON |
| SECOND PRESSURIZING VALVE | | | | | ON | ON | ON | ON | ON | ON |
| FIRST DISCHARGE VALVE | | | ON | | | ON | ON | | | |
| SECOND DISCHARGE VALVE | | ON | | | | | ON | ON | | |
| FIRST COMMUNICATION VALVE | | | | ON | | | ON | | ON | ON |
| SECOND COMMUNICATION VALVE | | ON | | | ON | | | ON | | |

Legend: shaded = ON, blank = OFF

FIG. 3

HIGH EFFICIENCY GAS CONCENTRATING APPARATUS AND METHOD OF CONTROLLING HIGH EFFICIENCY GAS CONCENTRATING APPARATUS

CROSS-REFERENCE TO RELATED APPLICATION

This application claims priority to and the benefit of Korean Patent Application No. 10-2009-0133285, filed on Dec. 29, 2009, which is herein incorporated by reference in its entirety.

BACKGROUND OF THE INVENTION

1. Field of the Invention

The present invention relates generally to a high efficiency gas concentrating apparatus and a method of controlling the same. The apparatus can remove and discharge nitrogen adsorbed in one of a pair of adsorption towers using a minimum amount of high purity oxygen concentrated in the other adsorption towers.

2. Description of the Related Art

Generally, a gas concentrating apparatus is configured to achieve only upper or lower equalization for first and second adsorption towers. A process for concentrating oxygen and a process for removing and discharging adsorbed nitrogen are alternately performed in the first and second adsorption towers.

Because the time taken per a half-cycle of one of the adsorption towers in the gar concentrating apparatus, where the oxygen is concentrated, is long, the operational energy of an air compressor increases, and thus the discharge noise of the nitrogen out of the second adsorption tower increases. Specifically, in order to discharge the nitrogen adsorbed in the second adsorption tower, the high purity oxygen is continuously supplied from the first adsorption tower to the second adsorption tower through an orifice that is optimized for a maximum amount of the high purity oxygen. At this point, if the oxygen is quantitatively produced, problems are not incurred because the amount of the high purity oxygen used for removing and discharging the adsorbed nitrogen is proportional to the amount of the oxygen produced.

However, for example, in the case of a portable gas concentrating apparatus, there is a need to actively control an amount of compressed air by adjusting the RPM (Revolution Per Minute) of the compressed air as much as the amount of the oxygen that is required. At this point, when the orifice is designed based on a maximum oxygen-flow rate, the concentrated oxygen may be excessively consumed to remove the nitrogen, even when only a small amount of oxygen is produced. Therefore, there is a need to implement countermeasures to this problem.

SUMMARY OF THE INVENTION

Embodiments are directed to a high efficiency gas concentrating apparatus and a method of controlling the apparatus, which substantially overcome one or more of the problems due to the limitations and disadvantages of the related art.

It is therefore a feature of an embodiment to provide a high efficiency gas concentrating apparatus and a method of controlling the apparatus, which can minimize consumption of high purity oxygen used for removing nitrogen adsorbed in an adsorption tower by actively controlling the consumption of the oxygen.

At least one of the above and other features and advantages may be realized by providing a high efficiency gas concentrating apparatus including an air compressor for supplying high pressure air; first and second adsorption towers that are disposed above the air compressor and communicating with the air compressor to adsorb nitrogen and concentrate oxygen as the high pressure air is alternately supplied thereto; first and second concentrating passages that are disposed above the respective first and second adsorption towers to discharge the concentrated oxygen; and a cleaning tank that is disposed between the first and second concentrating passages to receive a portion of the concentrated oxygen from one of the first and second adsorption towers, temporarily store the received concentrated oxygen therein, and alternately remove adsorbed nitrogen by supplying the temporarily concentrated oxygen to the other of the first and second adsorption towers.

At least one branch conduit for communicating the cleaning tank with the first and second adsorption towers may be installed between the first and second concentrating passages.

The branch conduits may include a first branch conduit disposed between the cleaning tank and the first adsorption tower and a second branch conduit disposed between the cleaning tank and the second adsorption tower.

The cleaning tank may be disposed between the first and second branch conduits.

A first communication valve for opening and closing a bidirectional passage may be installed on the first branch conduit.

A second communication valve for opening and closing a bidirectional passage may be installed on the second branch conduit.

An orifice for controlling an amount of fluid may be disposed on the first branch conduit between the first communication valve and the first adsorption tower.

An orifice for controlling an amount of fluid may be disposed on the second branch conduit between the second communication valve and the second adsorption tower.

The first and second concentrating passages may be connected to an oxygen storing tank for storing the concentrated oxygen.

A first check valve for providing a one-way passage may be installed between the first adsorption tower and the oxygen storing tank.

A second check valve for providing a one-way passage may be installed between the second adsorption tower and the oxygen storing tank.

A first compressed air supplying passage for supplying compressed air to the first adsorption tower may be installed between the first adsorption tower and the air compressor.

A second compressed air supplying passage for supplying compressed air to the second adsorption tower may be installed between the second adsorption tower and the air compressor.

A first pressurizing valve for opening and closing a passage for compressed air may be installed on the first compressed air supply passage.

A second pressurizing valve for opening and closing a passage for compressed air may be installed on the second compressed air supply passage.

A first nitrogen discharge passage for guiding the nitrogen that is being discharged may be installed between the first adsorption tower and the first pressurizing valve.

A second nitrogen discharge passage for guiding the nitrogen that is being discharged may be installed between the second adsorption tower and the second pressurizing valve.

A first discharge valve for opening and closing a passage for the nitrogen is installed on the first nitrogen discharge passage.

A second discharge valve for opening and closing a passage for the nitrogen may be installed on the second nitrogen discharge passage.

The high efficiency gas concentrating apparatus may further include a control unit for ON/OFF-controlling the first and second communication valves.

The control unit may further ON/OFF-control the first and second pressurizing valves and the first and second discharge valves.

At least one of the above and other features and advantages may be realized by providing a method for controlling a high efficiency gas concentrating apparatus including a pair of adsorption towers in which a process for concentrating oxygen and a process for removing, cleaning, and discharging nitrogen are alternately performed, the method including: pressurizing and supplying high pressure gas from an air compressor to one of the adsorption towers; allowing high purity oxygen to be adsorbed in one of the adsorption towers to generate the high purity oxygen at a predetermined pressure; allowing some of the high purity oxygen in one of the adsorption towers to be directed to and filled in the cleaning tank; and removing nitrogen adsorbed in one of the first and second adsorption towers using the high purity oxygen filled in the cleaning tank.

The method may further include reducing internal pressure of one of the adsorption towers.

The method may further include equalizing upper portions of the adsorption towers to recover the high purity oxygen generated in one of the adsorption tower by directing high pressure gas from the upper portion of one of the adsorption towers to the upper portion of the other of the adsorption tower.

The method may further include equalizing pressures of the adsorption towers by directing high pressure from a lower portion of one of the adsorption towers to a lower portion of the other of the adsorption tower, wherein the equalizing pressures of the adsorption towers is performed simultaneously with the equalizing upper portions of the adsorption towers.

According to the example embodiments, since the nitrogen adsorbed in one of the adsorption towers is actively discharged by the concentrated oxygen that is supplied from the other adsorption tank to the cleaning tank and then further supplied to the former, the consumption of the high purity oxygen used for discharging the nitrogen can be minimized and thus the oxygen recovery rate can be maximized.

In addition, since the filling time for the cleaning tank can be adjusted in accordance with a producing amount of the oxygen, the concentrated oxygen used for discharging the nitrogen can be sufficiently supplied even when a small amount of the oxygen is produced.

Further, when the present invention is applied to a portable gas concentrating device, a nitrogen removing amount can be optimized in accordance with an oxygen-flow rate and thus the power consumption can be minimized, thereby maximizing the battery running time.

These and other features of the present invention will be more readily apparent from the detailed description set forth below taken in conjunction with the accompanying drawings.

BRIEF DESCRIPTION OF THE DRAWINGS

The above and other features and advantages will become more apparent to those of ordinary skill in the art by describing in detail exemplary embodiments with reference to the attached drawings, in which:

FIG. 3 illustrates a view illustrating ON/OFF states of vales at processes of FIGS. 2A to 2J;

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments of the present invention will now be described in detail with reference to the accompanying drawings.

Figure 1:
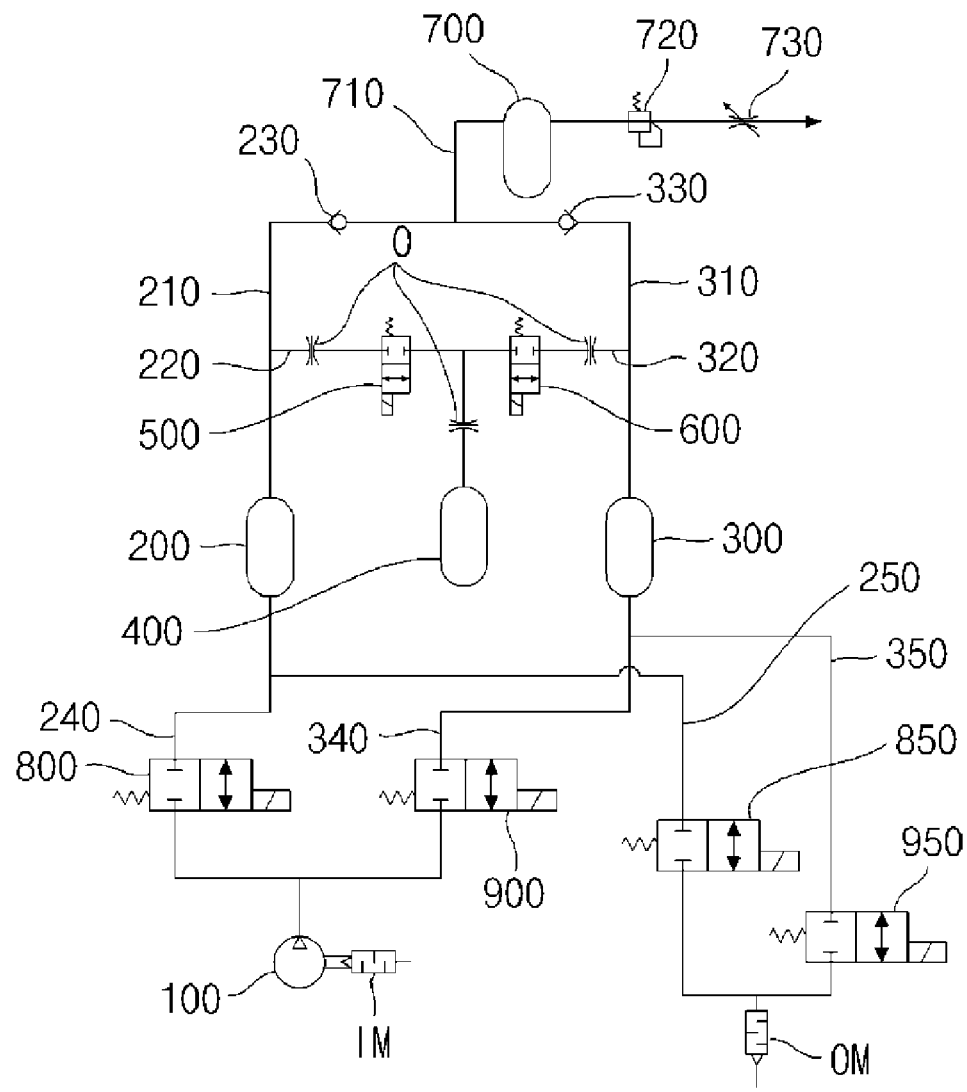
FIG. 1 illustrates a schematic view of a high efficiency gas concentrating apparatus in accordance with one embodiment.

FIG. 1 is a schematic view of a high efficiency gas concentrating apparatus in accordance with one embodiment.

As shown in FIG. 1, a high efficiency gas concentrating apparatus in accordance with one embodiment includes an air compressor 100 for supplying high pressure air, first and second adsorption towers 200 and 300 that are disposed above the air compressor 100 and communicating with the air compressor 100 to adsorb nitrogen and concentrate oxygen as high pressure air is alternately supplied thereto, first and second concentrating passages 210 and 310 that are disposed above the respective first and second adsorption towers 200 and 300 to discharge the concentrated oxygen, and a cleaning tank 400 that is disposed between the first and second concentrating passages 210 and 310 to receive a portion of the concentrated oxygen from one of the first and second adsorption towers 200 and 300, temporarily store the received concentrated oxygen therein, and alternately remove adsorbed nitrogen by supplying the concentrated oxygen to the other of the first and second adsorption towers 200 and 300.

An inlet muffler IM, which prevents noise when external air is introduced, is installed at the side of the air compressor 100.

In addition, the first and second concentrating passages 210 and 310 are connected to the cleaning tank 400 and the first and second adsorption towers 200 and 300 by branch conduits. The branch conduits include a first branch conduit 220 installed between the cleaning tank 400 and the first adsorption tower 200, and a second branch conduit 320 installed between the cleaning tank 400 and the second adsorption tower 300.

The first branch conduit 220 enables the concentrated oxygen to be supplied from the first adsorption tower 200 to the cleaning tank 400 and further enables the concentrated oxygen stored in the cleaning tank 400 to be supplied to the first adsorption tower 200. The second branch conduit 320 enables the concentrated oxygen to be supplied from the second adsorption tower 300 to the cleaning tank 400 and further enables the concentrated oxygen, stored in the cleaning tank 400, to be supplied to the second adsorption tower 300.

The cleaning tank 400 may be disposed between the first and second branch conduits 220 and 320.

In addition, the branch conduits may be provided with respective communication valves such that the fluid passages can be oppositely controlled. For instances, the first branch conduit 220 may be provided with a first bidirectional communication valve 500 and the second branch conduit 320 may be provided with a second bidirectional communication valve 600.

An orifice O is disposed on the first branch conduit 220 to control an amount of fluid between the first communication valve 500 and the first adsorption tower 200. An orifice O is disposed on the second branch conduit 220 to control an amount of fluid between the second communication valve 600 and the second adsorption tower 300.

Meanwhile, the first and second concentrating passages 210 and 310 are interconnected and then connected to a single concentrated oxygen discharge passage 710. An oxygen storing tank 700 for storing the concentrated oxygen may be installed on the concentrated oxygen discharge passage 710.

A pressure adjustor 720 and a fluid amount adjustor 730 may be further provided on a discharge end of the concentrated oxygen discharge passage 710.

A first check valve 230 for providing a one-way passage between the first adsorption tower 200 and the oxygen storing tank 700 is installed on the first concentrating passage 210. Likewise, a second check valve 330 for providing a one-way passage between the second adsorption tower 300 and the oxygen storing tank 700 is installed on the second concentrating passage 310.

Further, a first compressed air supplying passage is installed between the first adsorption tower 200 and the air compressor 100 to supply the compressed air to the first adsorption tower 200.

In addition, a second compressed air supplying passage is installed between the second adsorption tower 300 and the air compressor 100 to supply the compressed air to the second adsorption tower 300.

A first pressurizing valve 800 for opening and closing a passage for the compressed air is installed on the first compressed air supplying passage 240. A second pressurizing valve 900 for opening and closing a passage for the compressed air is installed on the second compressed air supplying passage 340.

A first nitrogen discharge passage 250 for guiding the nitrogen discharged from the first adsorption tower 200 is installed between the first adsorption tower 200 and the first pressurizing valve 800. In addition, a second nitrogen discharge passage 350 for guiding the nitrogen discharged from the second adsorption tower 300 is installed between the second adsorption tower 300 and the second pressurizing valve 900.

A first discharge valve 850 for opening and closing the passage for the discharged nitrogen is installed on the first nitrogen discharge passage 250. Likewise, a second discharge valve 950 for opening and closing the passage for the discharged nitrogen is installed on the second nitrogen discharge passage 350.

Further, the first and second nitrogen discharge passages 250 and 350 are interconnected and extend. An outlet muffler OM may be installed on the discharge end of the first and second nitrogen discharge passages 250 and 350.

In one embodiment, a control unit (not shown) for controlling ON/OFF operations of the first and second communication valves 500 and 600, first and second pressurizing valves 800 and 900, and first and second discharge valves 850 and 950 may also be provided.

The following will describe a method for controlling the above-described high efficiency gas concentrating apparatus with reference to the accompanying drawings.

Figure 4:
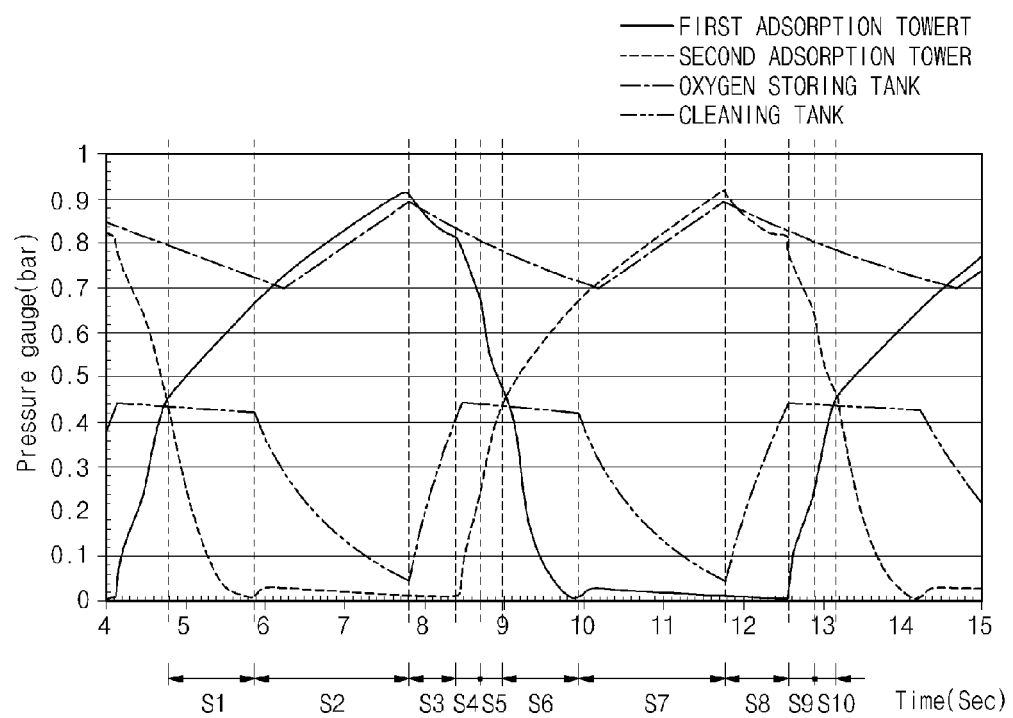
FIG. 4 illustrates a graph illustrating pressure distribution in each time of major parts in accordance with FIG. 3.
Figure 5:
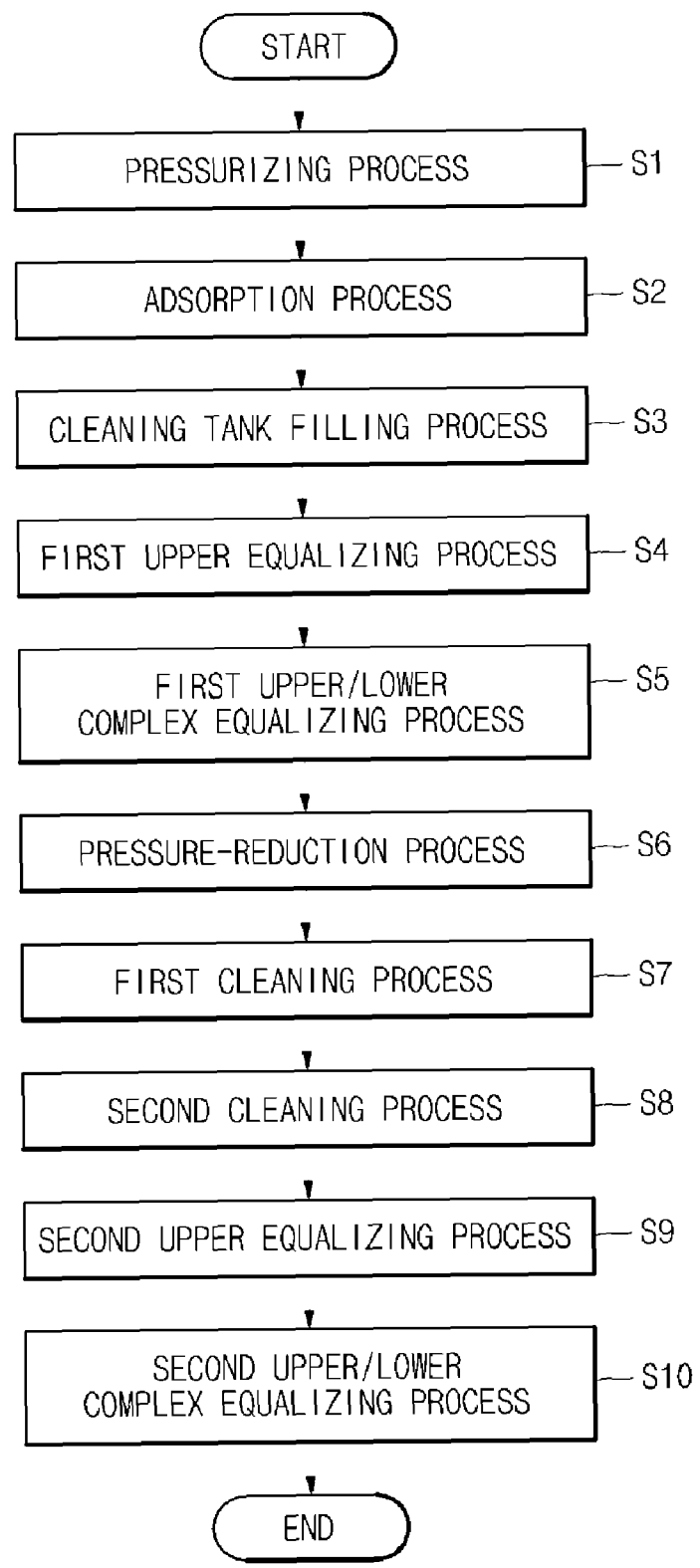
FIG. 5 illustrates a flowchart illustrating a method for controlling the high efficiency gas concentrating apparatus in accordance with one embodiment.

FIGS. 2A to 2J are views illustrating sequential processes for controlling the high efficiency gas concentrating apparatus of FIG. 1, FIG. 3 is a view illustrating ON/OFF states of vales at each process, FIG. 4 is a graph illustrating pressure distribution in each of the major parts in accordance with FIG. 3, and FIG. 5 is a flowchart illustrating a method for controlling the high efficiency gas concentrating apparatus in accordance with one embodiment.

In the following description, the control method will be described only with reference to the first adsorption tower 200. The control method for the first adsorption tower 200 is same as that of the first adsorption tower 200 and thus the detailed description thereof will be omitted herein.

First, a pressurizing process S1 is first performed.

Figure 2A:
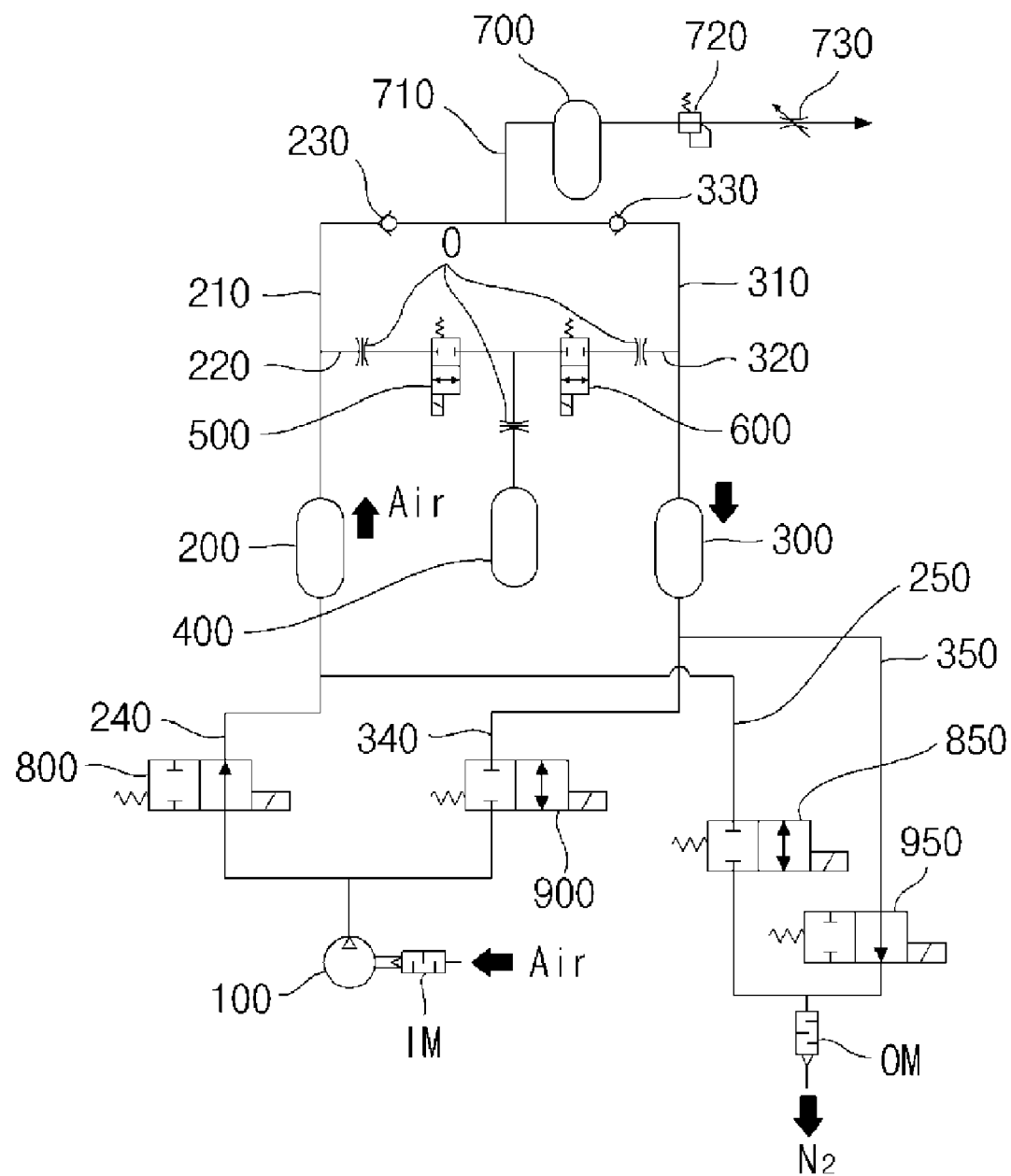
FIGS. 2A to 2J illustrate views illustrating sequential processes for controlling the high efficiency gas concentrating apparatus of FIG. 1.

As shown in FIGS. 2A and 3, the gas is highly pressurized by the air compressor 100 in a state where the first and second check valves 230 and 330 are closed. In this state, by the control unit, the first pressurizing valve 800 is controlled to be "ON" and the first communication valve 500 is controlled to be "OFF" so that the highly pressurized gas can be directed to the first adsorption tower 200. As a result, the adsorption tower 200 is upwardly pressurized as shown in FIG. 4. Accordingly, the degree of purity of the gas in the first adsorption tower 200 gradually increases.

Next, an adsorption process (a producing process) S2 is performed.

Figure 2B:
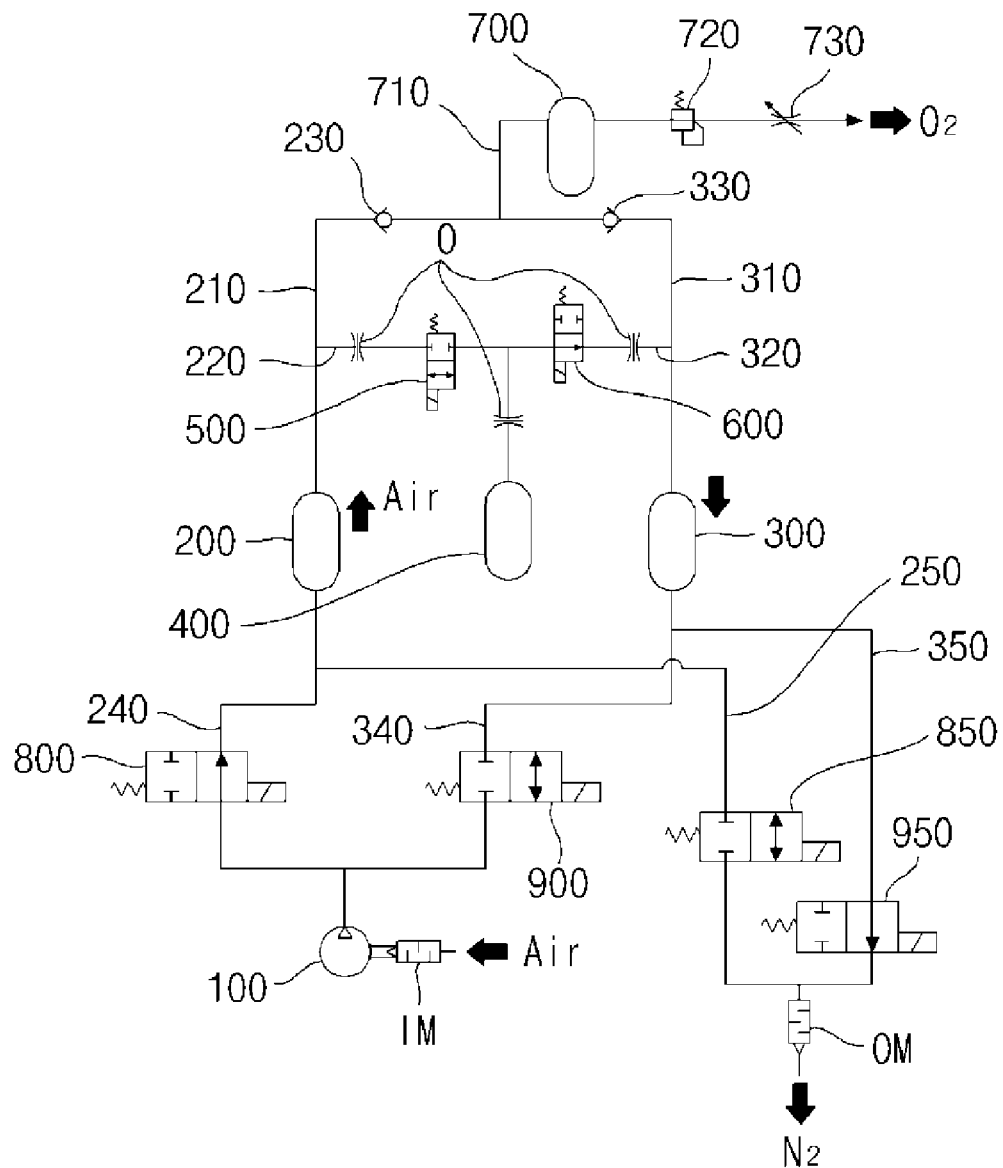

As shown in FIGS. 2B and 3, the gas is highly pressurized by the air compressor 100. In this state, as the first pressurizing valve 800 keeps the "ON" state and the first communication valve 500 keeps the "OFF" state, the first check valve 230 is controlled to be "ON" at the point in time when the pressure of the first adsorption tower 200 is equalized with the pressure of the oxygen storing tank 700. That is, the first check valve 230 is controlled to be "ON" when the pressure of the first adsorption tower 200 is greater than the pressure of the oxygen storing tank 700. As a result, the high purity oxygen is supplied to the oxygen storing tank 700.

The high purity oxygen stored in the oxygen storing tank 700 can be supplied to a user by manipulating an external manipulation panel.

Accordingly, as shown in FIG. 4, in the adsorption process S2, the pressure increase gradient becomes a little gentler than that in the pressurizing process S1.

Next, a cleaning tank filling process S3 is performed.

Figure 2C:
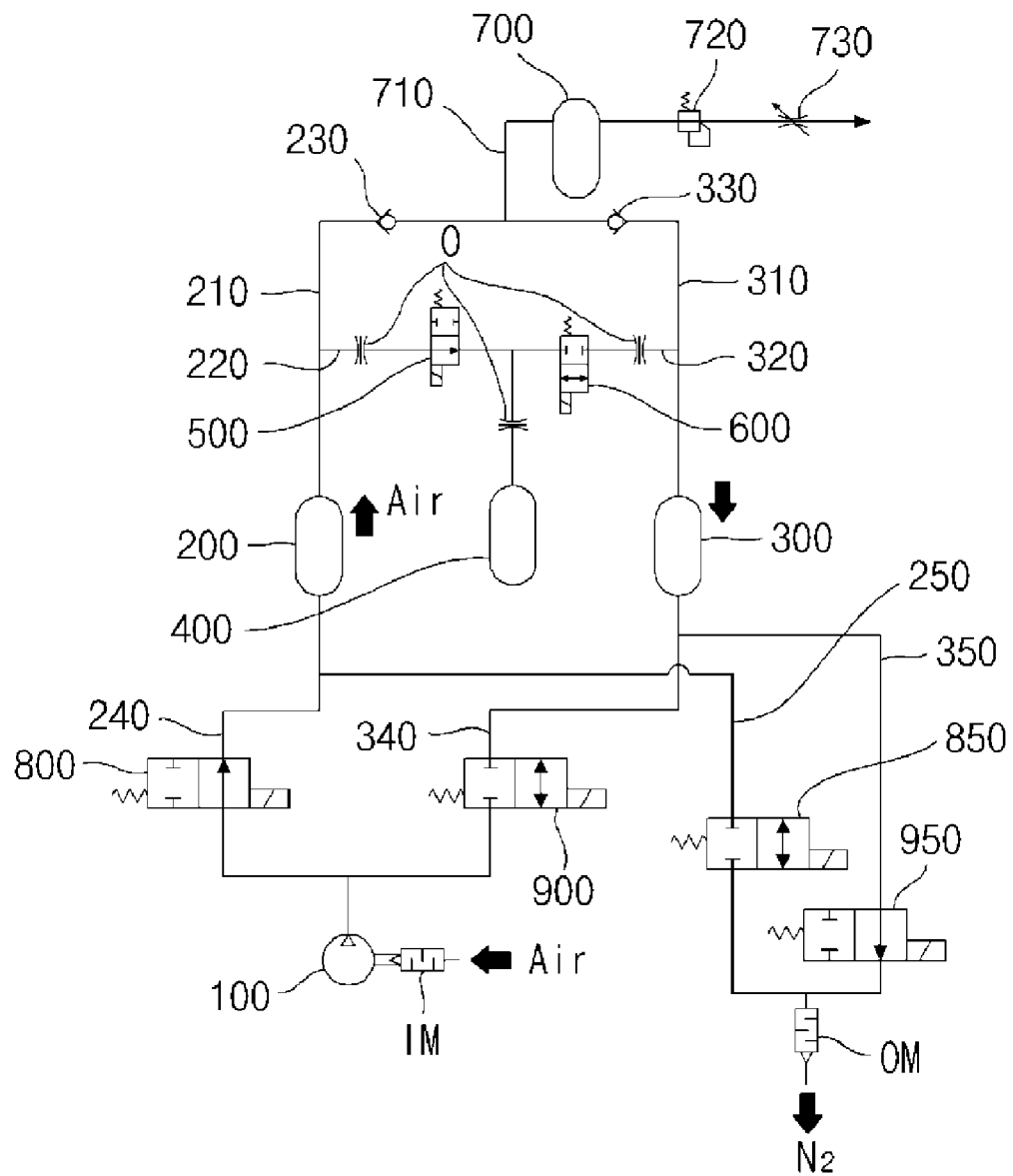

As shown in FIGS. 2C and 3, in a state where the first and second check valves 230 and 330 are in the "OFF" state, the first communication valve 500 is controlled to be "ON", and thus the high purity oxygen in the first adsorption tower 200 is partly directed to and filled in the cleaning tank 400 through the first branch conduit 220.

Accordingly, the internal pressure of the first adsorption tower 200 decreases as shown in FIG. 4.

The first pressurizing valve 800 keeps the "ON" state and thus the high pressure gas supply through the air compressor 100 is continued.

Next, a first upper equalizing process S4 is performed.

Figure 2D:
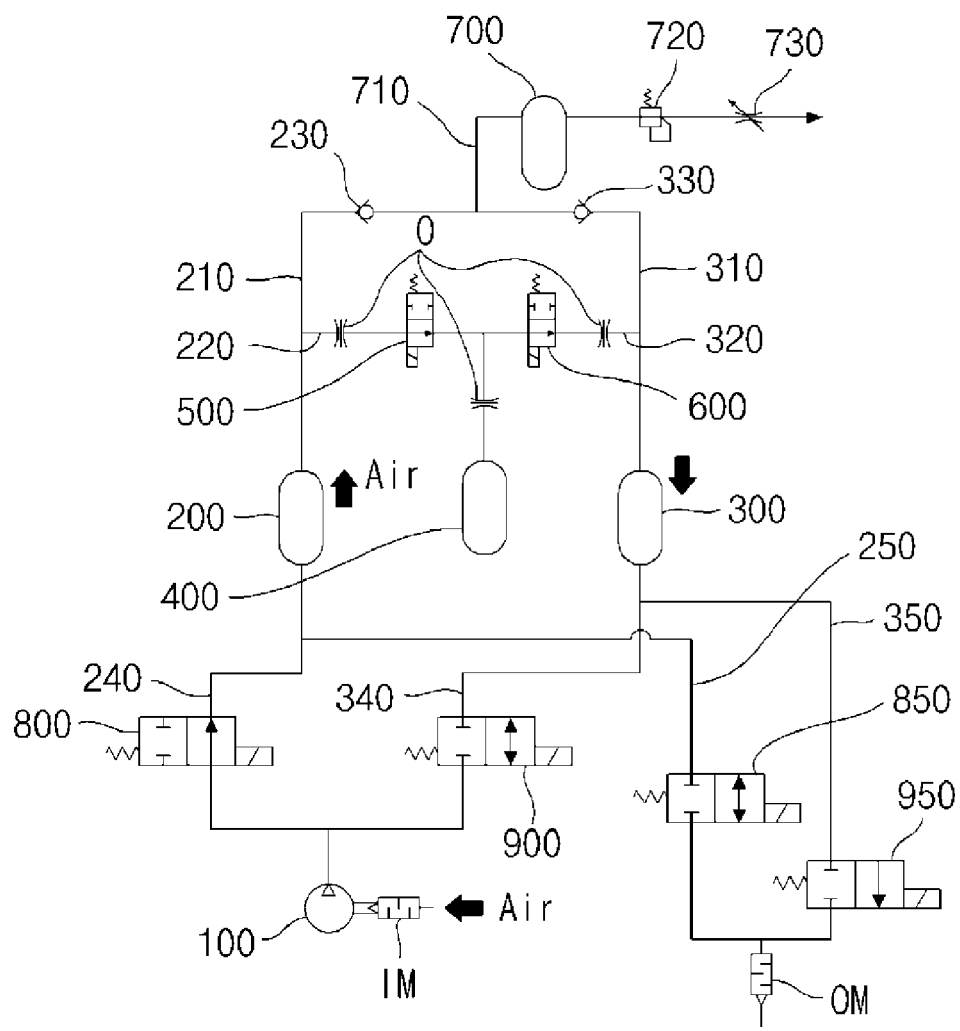

As shown in FIGS. 2D and 3, in a state where the first and second check valves 230 and 330 are in the "OFF" states, the first and second communication valves 500 and 600 are controlled to be "ON" by the control unit and thus the high pressure gas of the first adsorption tower 200 is directed to the second adsorption tower 300, thereby slightly reducing the pressure of the first adsorption tower 200 and, at the same time, slightly increasing the pressure of the second adsorption tower 300.

Referring to FIG. 4, while the curve of the first adsorption tower 200 initially moves downward, the pressure of the second adsorption tower 300 slightly increases, thereby achieving the upper equalization.

Therefore, as a result of the first upper equalizing process S4, some of the high purity oxygen generated in the first adsorption tower 200 can be recovered.

Next, a first upper/lower complex equalizing process S5 is performed, where a lower equalizing process is performed simultaneously with the first upper equalizing process S4.

Figure 2E:
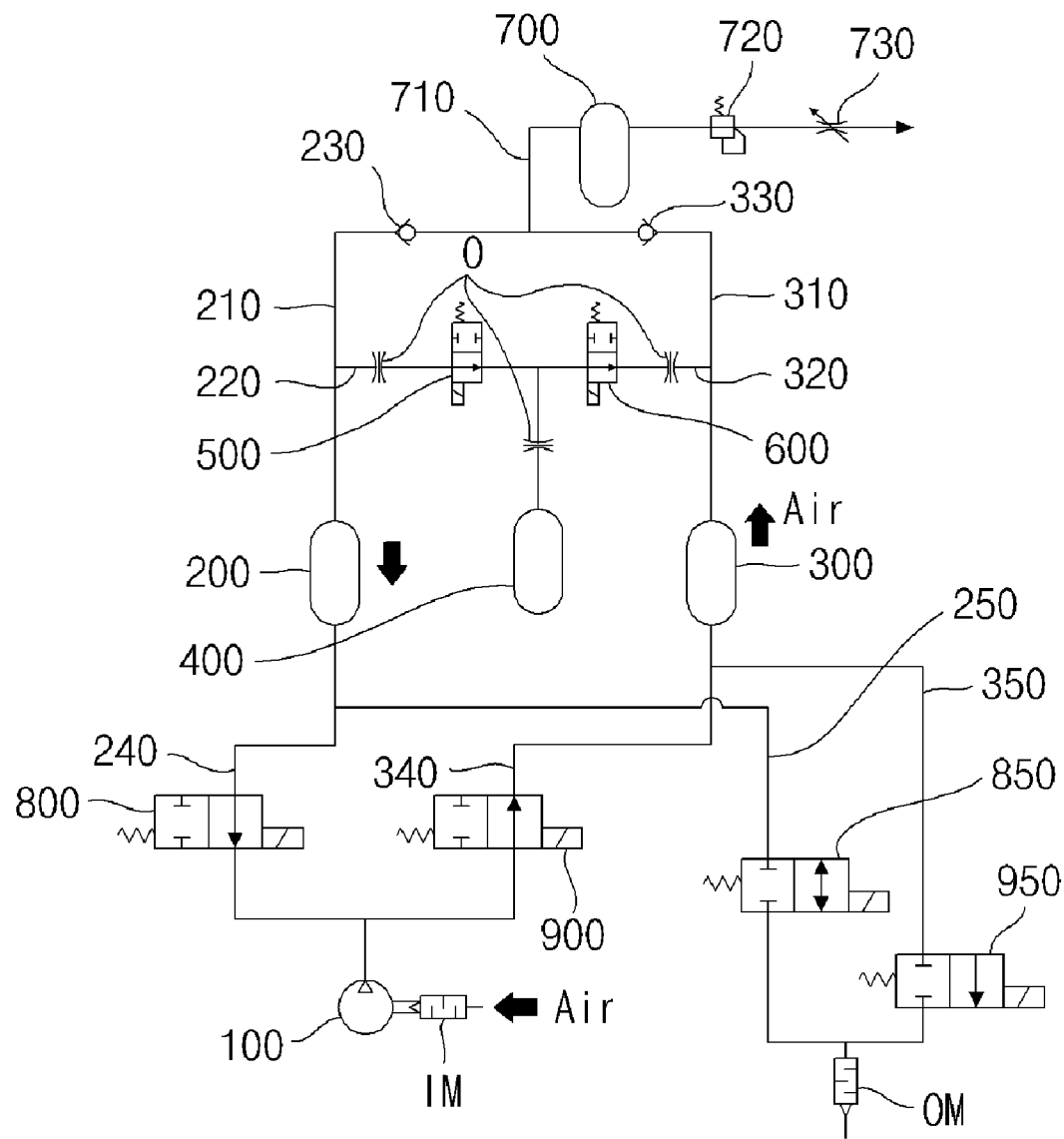

As shown in FIGS. 2E and 3, in the first upper/lower complex equalizing process S5, the valve controls in the first upper equalizing process S4 are maintained (see FIG. 3) and the second pressurizing valve 900 is controlled to be "ON" by the control unit. That is, the first pressuring valve 800, the second pressuring valve 900, the first communication valve 500, and the second communication valve 600 are controlled to be "ON".

As the first and second adsorption towers 200 and 300 communicate with each other by the first and second pressurizing valves 800 and 900, the compressed air at the lower portion of the first adsorption tower 200 is supplied to the lower portion of the second adsorption tower 300. Accordingly, the pressures of the first and second adsorption towers 200 and 300 are equalized as shown in FIG. 4.

As described above, since the upper equalization is processed while the lower equalization is performed, the pressure of the first adsorption tower 200 is quickly decreased and the pressure of the second adsorption tower 300 is quickly increased.

Since the upper and lower portions of each of the first and second adsorption towers 200 and 300 are simultaneously equalized, the operation time of the air compressor 100 can be minimized, and thus the energy efficiency can be improved.

As described previously, the required time for the re-pressurizing of the second adsorption tower 300 and the adsorption process can be reduced by approximately 3.0 seconds through the first upper equalizing process S4 and the first upper/lower complex equalizing process S5. Further, the number of the oxygen generation processes per minute of the second adsorption tower 300 can be increased and the oxygen recovery rate can be increased.

Next, a pressure-reduction process S6 is performed.

Figure 2F:
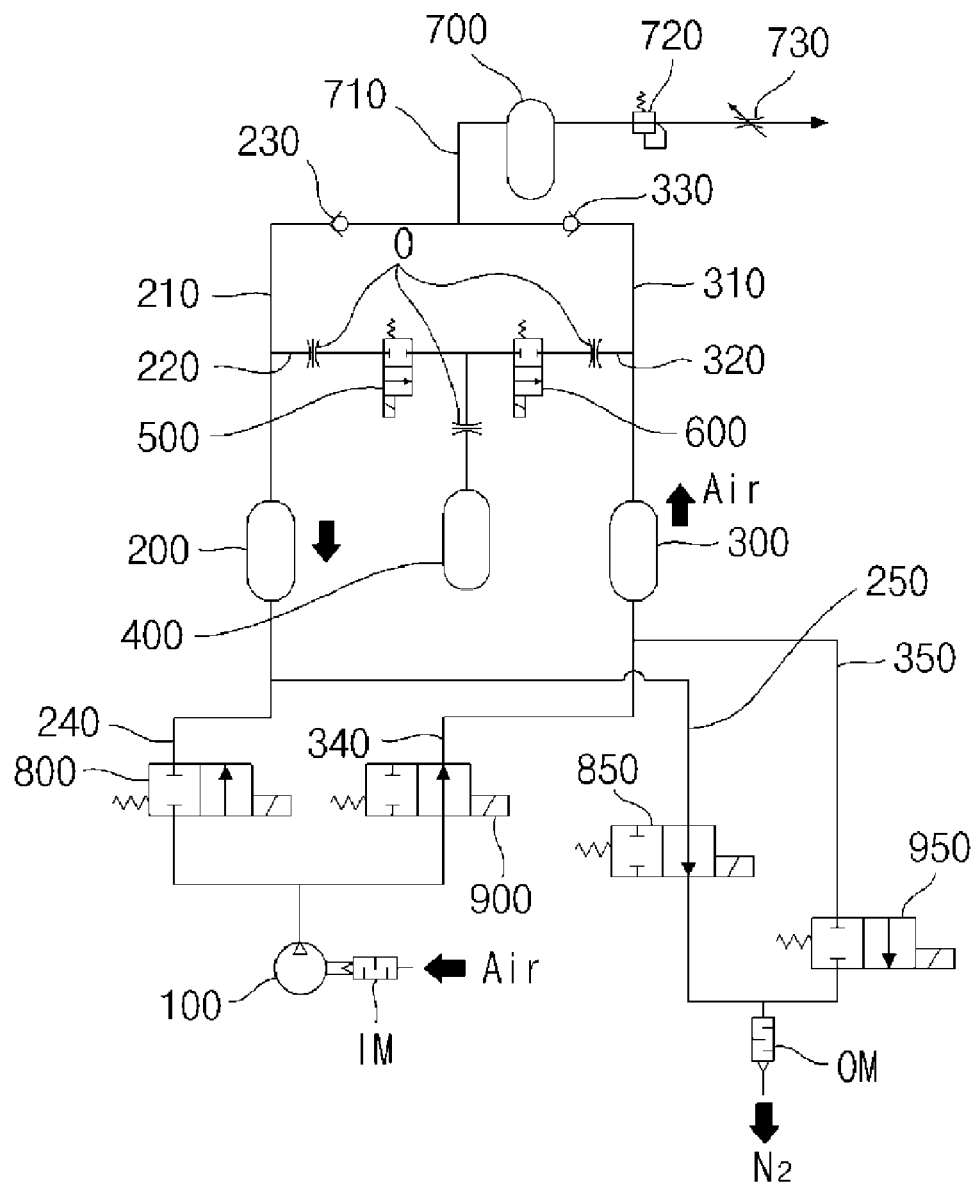

As shown in FIGS. 2F and 3, in the pressure-reduction process S6, the first and second check valves 230 and 330 are in the "OFF" states, the first pressurizing valve 800 and the first communication valve 500 are controlled to be "OFF" and the first discharge valve 850 is controlled to be "ON". Accordingly, the pressure of the first adsorption tower 200 is reduced as shown in FIG. 4. The pressure-reduction process S6 is performed to reduce the pressure of the compressed air in the first adsorption tower 200 to approximately the atmospheric pressure. The pressure-reduction process is a preparation process for performing first and second cleaning processes S7 and S8 that will be discussed hereinafter.

Referring to FIG. 4, the pressure at the point where the pressure-reduction process S6 starts is a level that is reduced from the pressure at the first upper equalizing process S4 and the first upper/lower complex equalizing process S5, and thus the discharge noise through the outlet muffler OM can be minimized.

Next, the first cleaning process S7 is performed.

Figure 2G:
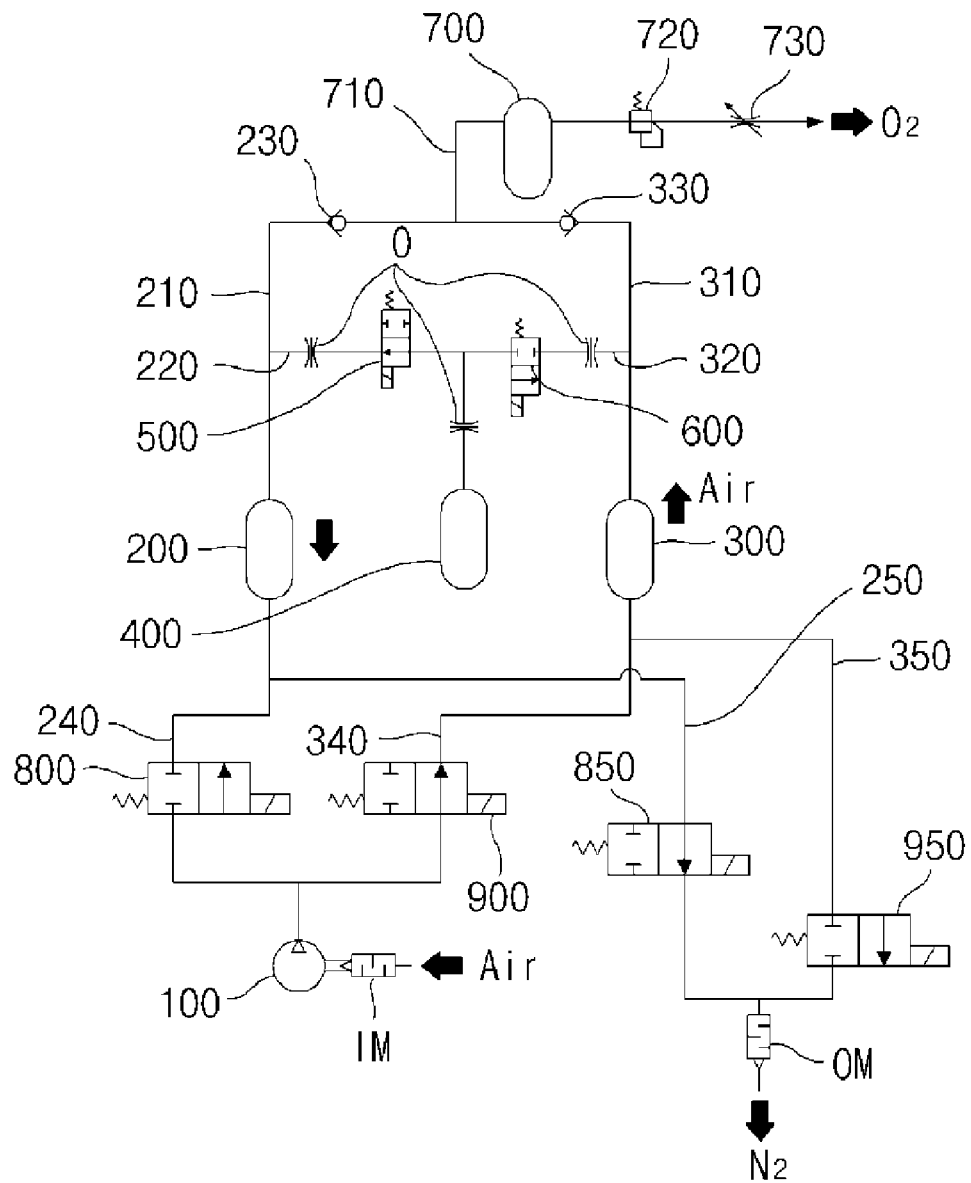

As shown in FIGS. 2G and 3, in the first cleaning process S7, the major valve controls in the pressure-reduction process S6 are maintained (see FIG. 3) and the first communication valve 500 is turned "ON" by the control unit. That is, the second pressuring valve 900, the first discharge valve 850, and the firs communication valve 500 are controlled to be "ON".

Therefore, the high purity oxygen in the cleaning tank 400 removes the nitrogen adsorbed in the first adsorption tower 200 through the first communication valve 500 and the removed nitrogen from the first adsorption tower 200 is discharged through the first nitrogen discharge passage 250 and the outlet muffler OM.

Accordingly, the internal pressure of the first adsorption tower 200 is gradually reduced to atmospheric pressure, as shown in FIG. 4.

Figure 2H:
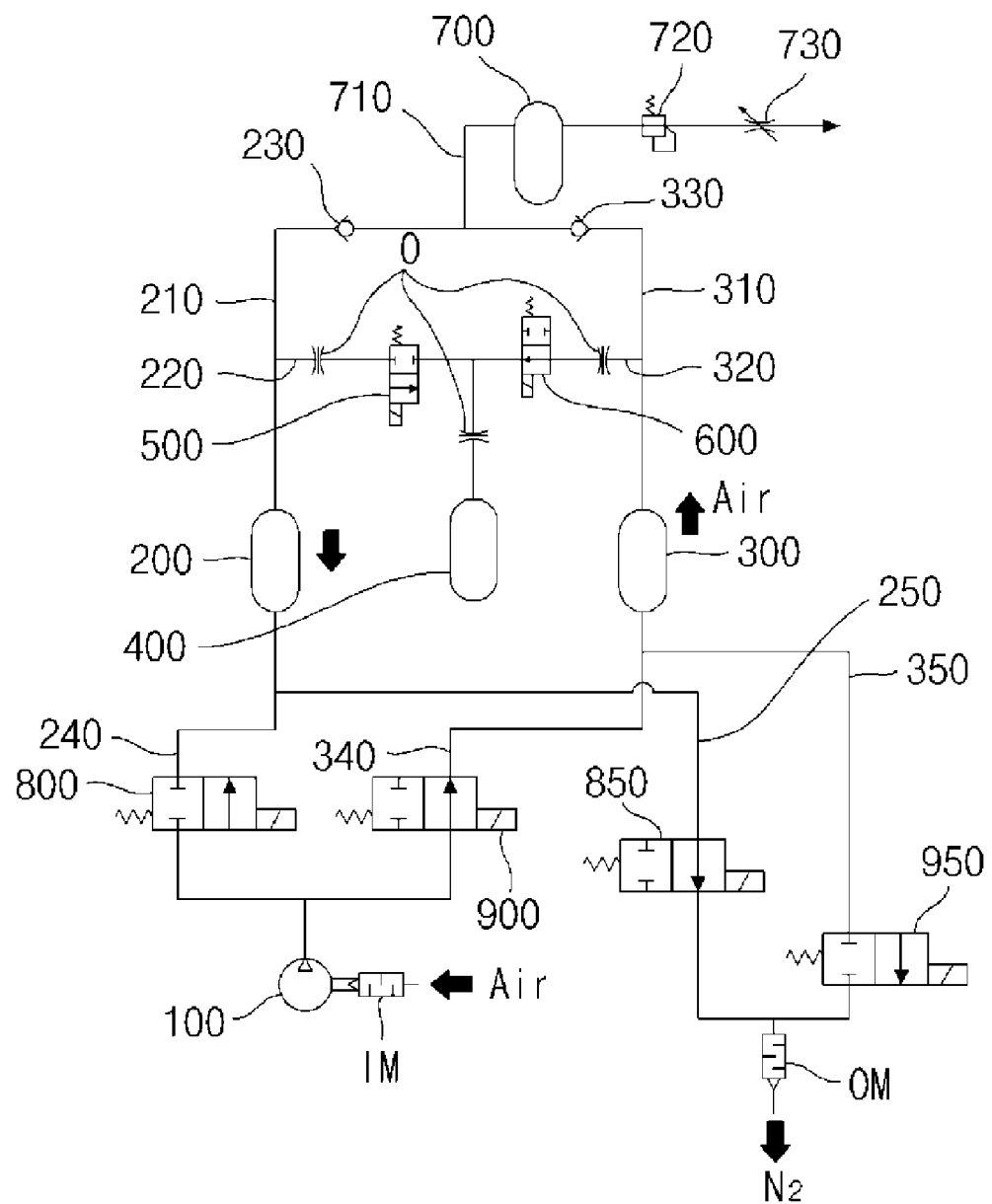

Next, as shown in FIG. 2H, the first communication valve 500 is controlled to be "OFF" to maintain the second cleaning process S8 for a predetermined time.

Next, a second upper equalizing process S9 is performed.

Figure 2I:
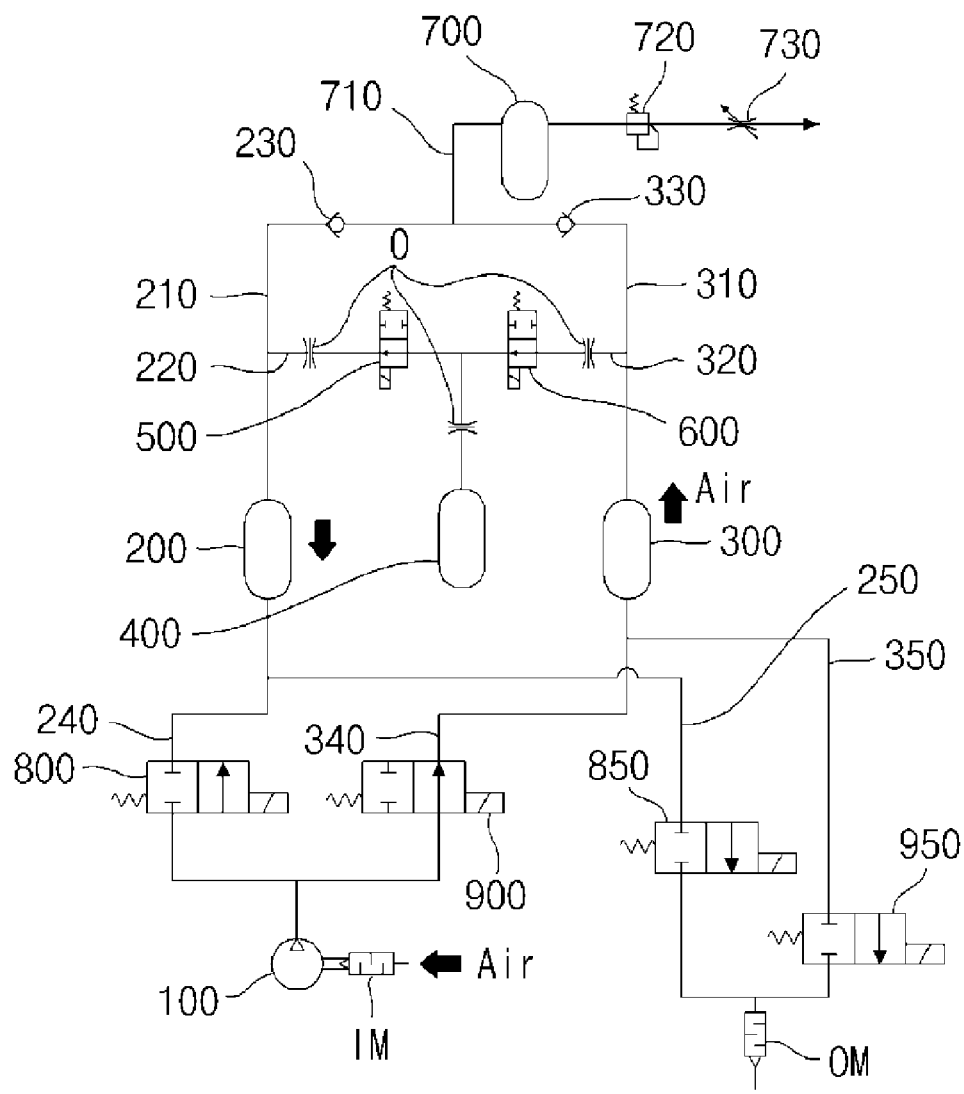

As shown in FIGS. 2I and 3, the first and second check valves 230 and 330 are in the "OFF" states, the first and second communication valves 500 and 600 are controlled to be "ON" by the control unit so that the high pressure gas of the second adsorption tower 300 is directed to the first adsorption tower 200. As a result, the pressure of the second adsorption tower 300 is slightly reduced while the pressure of the first adsorption tower 200 is slightly increased.

Referring to FIG. 4, the upper equalization where the curve of the second adsorption tower 300 initially moves downward and the pressure of the first adsorption tower 300 is increased.

Therefore, as a result of the second upper equalization process S9, the high purity oxygen generated in the second adsorption tower 300 can be partly recovered.

Next, a second upper/lower complex equalizing process S10 is performed, where the second upper equalizing process S9 is performed simultaneously with a lower equalizing process.

Figure 2J:
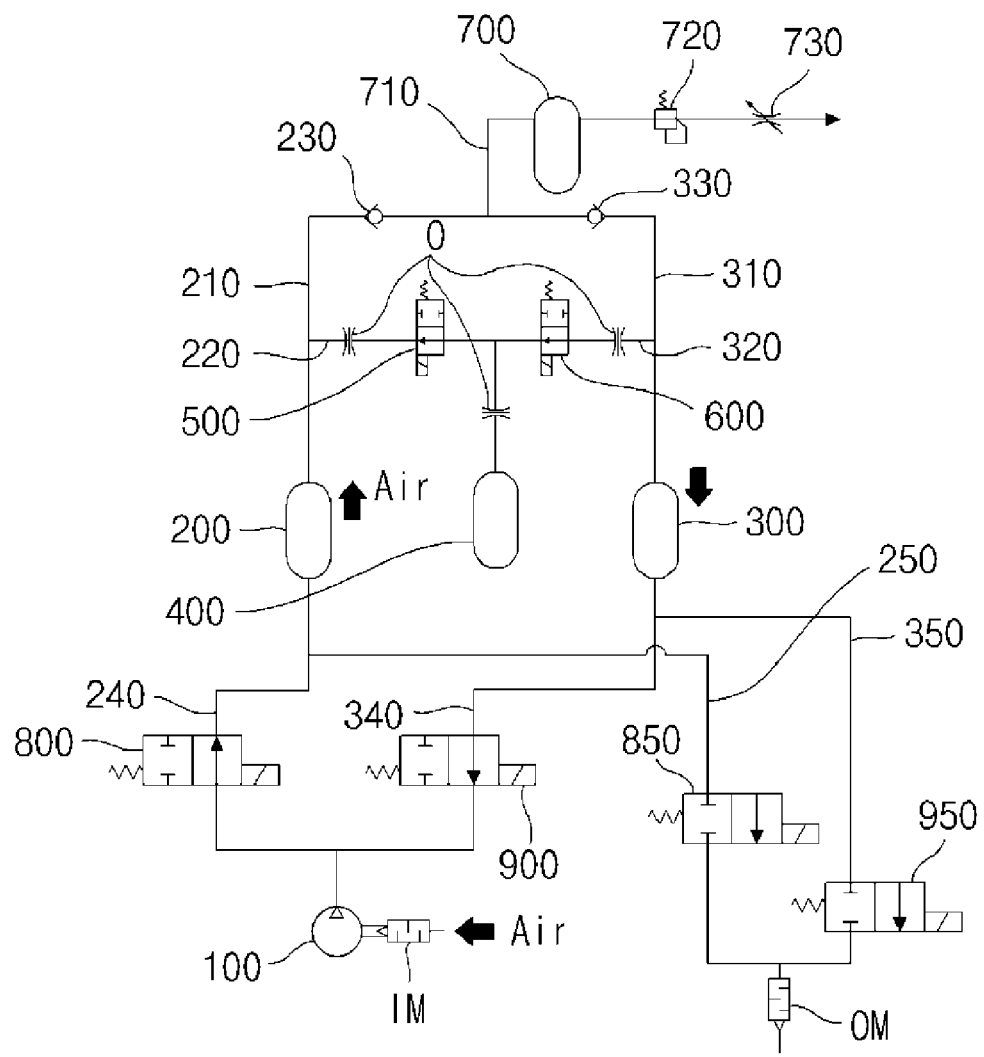

As shown in FIGS. 2J and 3, in the second upper/lower complex equalizing process, the major valve controls in the second upper equalizing process S9 are maintained (see FIG. 3) and the first pressurizing valve 800 is additionally controlled to be "ON" by the control unit. That is, the first pressurizing valve 800, the second pressuring valve 900, the first communication valve 500, and the second communication valve 600 are controlled to be "ON".

As the first and second adsorption towers 200 and 300 communicate with each other by the first and second pressurizing valves 800 and 900, the compressed air at the lower portion of the second adsorption tower 300 is directed to the lower portion of the first adsorption tower 200. Accordingly, the pressures of the first and second adsorption towers 200 and 300 are equalized.

Since the upper equalizing process is performed simultaneously with the lower equalizing process, the pressure of the second adsorption tower 300 is quickly decreased and the first adsorption tower 200 is quickly increased.

Accordingly, after the upper equalizing process for the first and second adsorption towers 200 and 300 are performed, the upper and lower equalizing processes are simultaneously performed, and thus the operation time of the air compressor 100 can be minimized.

As described above, the required time to the re-pressurizing of the second adsorption tower 300 and the adsorption process can be reduced by approximately 3.0 seconds through the second upper equalizing process S9 and the second upper/lower complex equalizing process S10. Further, the number of the oxygen generation processes per minute of the second adsorption tower 300 can be increased, thereby increasing the oxygen recovery rate.

According to the embodiment, since the pressurized air of one of the adsorption towers is used to re-pressurize the other adsorption tower, the time for supplying the high pressure gas can be shorted, and thus the operation efficiency of the air compressor can be improved.

Furthermore, since the nitrogen adsorbed in the adsorption tower is discharged at a lower pressure state, the discharge noise can be reduced.

Since the nitrogen adsorbed in one of the adsorption towers is actively discharged by the concentrated oxygen that is supplied from the other adsorption tank to the cleaning tank, and then further supplied to the former, the consumption of the high purity oxygen used for discharging the nitrogen can be minimized, and thus the oxygen recovery rate can be maximized.

In addition, since the filling time for the cleaning tank can be adjusted in accordance with the amount of oxygen produced, the concentrated oxygen used for discharging the nitrogen can be sufficiently supplied, even when a small amount of the oxygen is produced.

Further, when the present invention is applied to a portable gas concentrating device, the nitrogen removal amount can be optimized in accordance with an oxygen-flow rate, and thus the power consumption can be minimized, thereby maximizing the battery running time.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A high efficiency gas concentrating apparatus comprising:
    an air compressor for supplying high pressure air;
    first and second adsorption towers that are disposed above the air compressor and communicating with the air compressor to adsorb nitrogen and concentrate oxygen as the high pressure air is alternately supplied thereto;
    first and second concentrating passages that are disposed above the respective first and second adsorption towers to discharge the concentrated oxygen; and
    a cleaning tank that is disposed between the first and second concentrating passages to receive a portion of the concentrated oxygen from one of the first and second adsorption towers, temporarily store the received concentrated oxygen therein, and alternately remove adsorbed nitrogen by supplying the temporarily concentrated oxygen to the other of the first and second adsorption towers.

2. The high efficiency gas concentrating apparatus of claim 1 further comprising:
    a branch conduit installed between the first and second concentrating passages for communicating the cleaning tank with the first and second adsorption towers.

3. The high efficiency gas concentrating apparatus of claim 2 wherein the branch conduit comprises:
    a first branch conduit disposed between the cleaning tank and the first adsorption tower; and
    a second branch conduit disposed between the cleaning tank and the second adsorption tower.

4. The high efficiency gas concentrating apparatus of claim 3 wherein the cleaning tank is disposed between the first and second branch conduits.

5. The high efficiency gas concentrating apparatus of claim 3 further comprising:
    a first communication valve installed on the first branch conduit for opening and closing a bidirectional passage.

6. The high efficiency gas concentrating apparatus of claim 5 further comprising:
    a second communication valve installed on the second branch conduit for opening and closing a bidirectional passage.

7. The high efficiency gas concentrating apparatus of claim 5 further comprising:
    an orifice for controlling an amount of fluid is disposed on the first branch conduit between the first communication valve and the first adsorption tower.

8. The high efficiency gas concentrating apparatus of claim 6 further comprising:
    an orifice for controlling an amount of fluid is disposed on the second branch conduit between the second communication valve and the second adsorption tower.

9. The high efficiency gas concentrating apparatus of claim 1 further comprising:
    an oxygen storing tank connected to the first and second concentrating passages for storing the concentrated oxygen.

10. The high efficiency gas concentrating apparatus of claim 9 further comprising:
    a first check valve installed on the first concentrating passage between the first adsorption tower and the oxygen storing tank for providing a one-way passage.

11. The high efficiency gas concentrating apparatus of claim 9 further comprising:
    a second check valve installed on the second concentrating passage between the second adsorption tower and the oxygen storing tank for providing a one-way passage.

12. The high efficiency gas concentrating apparatus of claim 1 further comprising:
    a first compressed air supplying passage installed between the first adsorption tower and the air compressor for supplying compressed air to the first adsorption tower.

13. The high efficiency gas concentrating apparatus of claim 1 further comprising:
    a second compressed air supplying passage installed between the second adsorption tower and the air compressor for supplying compressed air to the second adsorption tower.

14. The high efficiency gas concentrating apparatus of claim 12 further comprising:
    a first pressurizing valve installed on the first compressed air supply passage for opening and closing a passage for compressed air.

15. The high efficiency gas concentrating apparatus of claim 13 further comprising:

a second pressurizing valve installed on the second compressed air supply passage for opening and closing a passage for compressed air.

16. The high efficiency gas concentrating apparatus of claim 14 further comprising:

a first nitrogen discharge passage installed between the first adsorption tower and the first pressurizing valve for guiding the nitrogen that is discharged from the first adsorption tower.

17. The high efficiency gas concentrating apparatus of claim 15 further comprising:

a second nitrogen discharge passage installed between the second adsorption tower and the second pressurizing valve for guiding the nitrogen that is discharged from the second adsorption tower.

18. The high efficiency gas concentrating apparatus of claim 16 further comprising:

a first discharge valve installed on the first nitrogen discharge passage for opening and closing the first nitrogen discharge passage.

19. The high efficiency gas concentrating apparatus of claim 17 further comprising:

a second discharge valve installed on the second nitrogen discharge passage for opening and closing the second nitrogen discharge passage.

20. The high efficiency gas concentrating apparatus of claim 6 further comprising:

a control unit for ON/OFF-controlling the first and second communication valves.

21. The high efficiency gas concentrating apparatus of claim 20 wherein the control unit further ON/OFF-controls the first and second pressurizing valves and the first and second discharge valves.

* * * * *